(12) United States Patent
Nezaki

(10) Patent No.: US 8,104,790 B2
(45) Date of Patent: Jan. 31, 2012

(54) VEHICULAR OCCUPANT RESTRAINT SYSTEM

(75) Inventor: Takuya Nezaki, Mizunami (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 27 days.

(21) Appl. No.: 12/534,193

(22) Filed: Aug. 3, 2009

(65) Prior Publication Data
US 2010/0025972 A1 Feb. 4, 2010

(30) Foreign Application Priority Data
Aug. 1, 2008 (JP) ................. 2008-200149

(51) Int. Cl.
*B60R 21/18* (2006.01)
(52) U.S. Cl. ....................................................... 280/733
(58) Field of Classification Search .................. 280/729, 280/730.1, 730.2, 733, 743.1
See application file for complete search history.

(56) References Cited

U.S. PATENT DOCUMENTS

| | | | |
|---|---|---|---|
| 3,682,498 A * | 8/1972 | Rutzki | 280/733 |
| 3,865,398 A * | 2/1975 | Woll | 280/733 |
| 3,905,615 A * | 9/1975 | Schulman | 280/730.1 |
| 3,948,541 A * | 4/1976 | Schulman | 280/733 |
| 5,758,900 A * | 6/1998 | Knoll et al. | 280/733 |
| 6,237,945 B1 * | 5/2001 | Aboud et al. | 280/733 |
| 6,705,641 B2 * | 3/2004 | Schneider et al. | 280/733 |
| 7,665,761 B1 * | 2/2010 | Green et al. | 280/733 |
| 7,766,382 B2 * | 8/2010 | Murakami | 280/733 |
| 2002/0011723 A1 * | 1/2002 | Lewis | 280/735 |
| 2003/0168837 A1 * | 9/2003 | Schneider et al. | 280/733 |
| 2003/0218319 A1 * | 11/2003 | Amamori | 280/729 |
| 2004/0075255 A1 * | 4/2004 | Honda et al. | 280/730.2 |
| 2005/0184489 A1 * | 8/2005 | Kobayashi | 280/729 |
| 2005/0230945 A1 * | 10/2005 | Watanabe | 280/733 |
| 2005/0275199 A1 * | 12/2005 | Helmstetter | 280/730.1 |
| 2006/0028004 A1 * | 2/2006 | Oota et al. | 280/733 |
| 2006/0119085 A1 * | 6/2006 | Masuda et al. | 280/733 |
| 2006/0196715 A1 * | 9/2006 | Fujishiro et al. | 180/271 |
| 2006/0255573 A1 * | 11/2006 | Tobata et al. | 280/733 |
| 2007/0096444 A1 * | 5/2007 | Bostrom et al. | 280/730.2 |
| 2007/0102909 A1 * | 5/2007 | Nezaki et al. | 280/733 |
| 2007/0102910 A1 * | 5/2007 | Nezaki et al. | 280/733 |

(Continued)

FOREIGN PATENT DOCUMENTS

JP 49013215 B 3/1974

(Continued)

*Primary Examiner* — Paul N Dickson
*Assistant Examiner* — Barry Gooden, Jr.
(74) *Attorney, Agent, or Firm* — Gifford, Krass, Sprinkle, Anderson & Citkowski, P.C.

(57) ABSTRACT

A vehicular occupant restraint system including: a four-point seatbelt system having left and right webbings for restraining an occupant, each of the left and right webbings having an upper body restraining portion that restrains the upper body of the occupant; a left first inflating portion which is provided on the upper body restraining portion of the left webbing and which inflates by receiving a gas supply and deploys in front of the upper body of the occupant, and a right first inflating portion which is provided on the upper body restraining portion of the right webbing and which inflates by receiving a gas supply and deploys in front of the upper body of the occupant; and a second inflating portion which inflates by receiving a gas supply when the first inflating portions inflate, and deploys to support the first inflating portions from the outside in the seat width direction.

8 Claims, 6 Drawing Sheets

U.S. PATENT DOCUMENTS

| | | | |
|---|---|---|---|
| 2007/0182136 A1* | 8/2007 | Nezaki et al. | 280/733 |
| 2007/0182137 A1* | 8/2007 | Hiroshige et al. | 280/733 |
| 2008/0061538 A1* | 3/2008 | Mohammad et al. | 280/730.2 |
| 2008/0100045 A1* | 5/2008 | Fukawatase et al. | 280/730.2 |
| 2008/0129024 A1* | 6/2008 | Suzuki et al. | 280/734 |
| 2009/0051150 A1* | 2/2009 | Murakami | 280/733 |
| 2009/0066063 A1* | 3/2009 | Mical | 280/733 |
| 2009/0066064 A1* | 3/2009 | Murakami | 280/733 |
| 2009/0179406 A1* | 7/2009 | Haraoka et al. | 280/733 |
| 2009/0179407 A1* | 7/2009 | Kalandek | 280/733 |
| 2009/0184503 A1* | 7/2009 | Itoga | 280/733 |
| 2009/0200775 A1* | 8/2009 | Sugimoto et al. | 280/730.2 |
| 2009/0236828 A1* | 9/2009 | Foubert et al. | 280/728.2 |
| 2009/0256337 A1* | 10/2009 | Pan | 280/733 |
| 2009/0278339 A1* | 11/2009 | Azuma et al. | 280/730.2 |
| 2009/0278340 A1* | 11/2009 | Azuma et al. | 280/733 |
| 2009/0283994 A1* | 11/2009 | Ruthinowski et al. | 280/733 |
| 2009/0302584 A1* | 12/2009 | Sugimoto et al. | 280/730.1 |
| 2010/0025972 A1* | 2/2010 | Nezaki | 280/730.1 |
| 2010/0109302 A1* | 5/2010 | Nezaki | 280/733 |
| 2010/0115737 A1* | 5/2010 | Foubert | 24/164 |
| 2010/0164207 A1* | 7/2010 | Sekizuka et al. | 280/733 |
| 2010/0194083 A1* | 8/2010 | Sugimoto et al. | 280/730.2 |
| 2010/0201108 A1* | 8/2010 | Iwayama et al. | 280/730.2 |

FOREIGN PATENT DOCUMENTS

| | | |
|---|---|---|
| JP | 49013215 U | 3/1974 |
| JP | 63258239 A | 10/1988 |
| JP | 07329688 A | 12/1995 |
| JP | 11180241 A | 7/1999 |
| JP | 2000142303 | 5/2000 |
| JP | 2005297917 | 10/2005 |
| JP | 2006044614 A | 2/2006 |
| JP | 2006160062 | 6/2006 |
| JP | 2007112415 A | 5/2007 |
| JP | 2007203898 A | 8/2007 |

* cited by examiner

VEHICULAR OCCUPANT RESTRAINT SYSTEM

INCORPORATION BY REFERENCE

The disclosure of Japanese Patent Application No. 2008-200149 filed on Aug. 1, 2008, including the specification, drawings and abstract is incorporated herein by reference in its entirety.

BACKGROUND OF THE INVENTION

1. Field of the Invention

The invention relates to a vehicular occupant restraint system for restraining an occupant seated in a seat, in the seat at least during a collision.

2. Description of the Related Art

Japanese Patent Application Publication No. 2006-44614 (JP-A-2006-44614) describes technology for deploying airbags, which are provided on a shoulder belt and a lap belt of a three-point seatbelt system, between the head and thigh region of an occupant in such a manner that the airbags overlap with one another vertically. Also, Japanese Patent Application Publication No. 2007-112415 (JP-A-2007-112415) describes technology in which an inflatable portion is provided on a shoulder belt portion of a three-point seatbelt system, and a belt guide for pushing the inflated shoulder belt portion up next to the head of an occupant is provided on a shoulder portion of the seatback. Moreover, U.S. Pat. No. 6,705,641B2 describes technology in which an inflating portion that is inflated by a supply of gas is provided on each of left and right shoulder belts and on each of left and right lap belts of a four-point seatbelt system.

However, none of the technologies described above take into account lateral displacement of the inflating portion of the shoulder belt when it is inflated, with respect to the occupant. Therefore, there is room for improvement when providing an inflating portion on a shoulder belt of a four-point seatbelt.

SUMMARY OF THE INVENTION

This invention thus provides a vehicular occupant restraint system that is able to effectively protect an occupant with a four-point seatbelt.

A first aspect of the invention relates to a vehicular occupant restraint system that includes a four-point seatbelt system, left and right first inflating portions, and a second inflating portion. The four-point seatbelt system has left and right webbings for restraining an occupant, each of the left and right webbings having an upper body restraining portion that restrains the upper body of the occupant. The left first inflating portion is provided on the upper body restraining portion of the left webbing, and inflates by receiving a supply of gas and deploys in front of the upper body of the occupant. The right first inflating portion is provided on the upper body restraining portion of the right webbing, and inflates by receiving a supply of gas and deploys in front of the upper body of the occupant. The second inflating portion inflates by receiving a supply of gas when the first inflating portions inflate, and deploys to support the first inflating portions from the outside in the seat width direction.

According to this aspect, the left and right webbings of the four-point seatbelt system are worn so that they can restrain a portion, including the upper body, of the occupant. For example, when a vehicle collision (such as a front impact) is detected or predicted, at least one gas supplying device is activated to supply gas to the left and right first inflating portions, causing the left and right first inflating portions to inflate and deploy in a predetermined shape. Here, with this vehicular occupant restraint system, the first inflating portions are supported from the outside in the seat width direction by the second inflating portion that has already inflated and deployed, so the first inflating portions are inhibited from becoming displaced in the seat width direction with respect to the occupant. That is, the first inflating portions are inflated and deployed in the proper positions with respect to the occupant.

A second aspect of the invention relates to a vehicular occupant restraint system that includes a four-point seatbelt system, left and right first inflating portions, and inhibiting mechanisms. The four-point seatbelt system has left and right webbings for restraining an occupant, each of the left and right webbings having an upper body restraining portion that restrains the upper body of the occupant. The left first inflating portion is provided on the upper body restraining portion of the left webbing, and inflates by receiving a supply of gas and deploys in front of the upper body of the occupant. The right first inflating portion is provided on the upper body restraining portion of the right webbing, and inflates by receiving a supply of gas and deploys in front of the upper body of the occupant. The inhibiting mechanisms inhibit the upper body restraining portions of the left and right webbings from becoming displaced in the seat width direction with respect to the occupant when the first inflating portions inflate.

In this way, with the aspects described above, the occupant is able to be more effectively protected by the first inflating portions provided on the upper body restraining portions of the webbings that form part of the four-point seatbelt system.

As described above, the foregoing aspects are extremely effective for protecting an occupant with first inflating portions provided on the upper body restraining portions of webbings that form a four-point seatbelt system.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Figure 1:
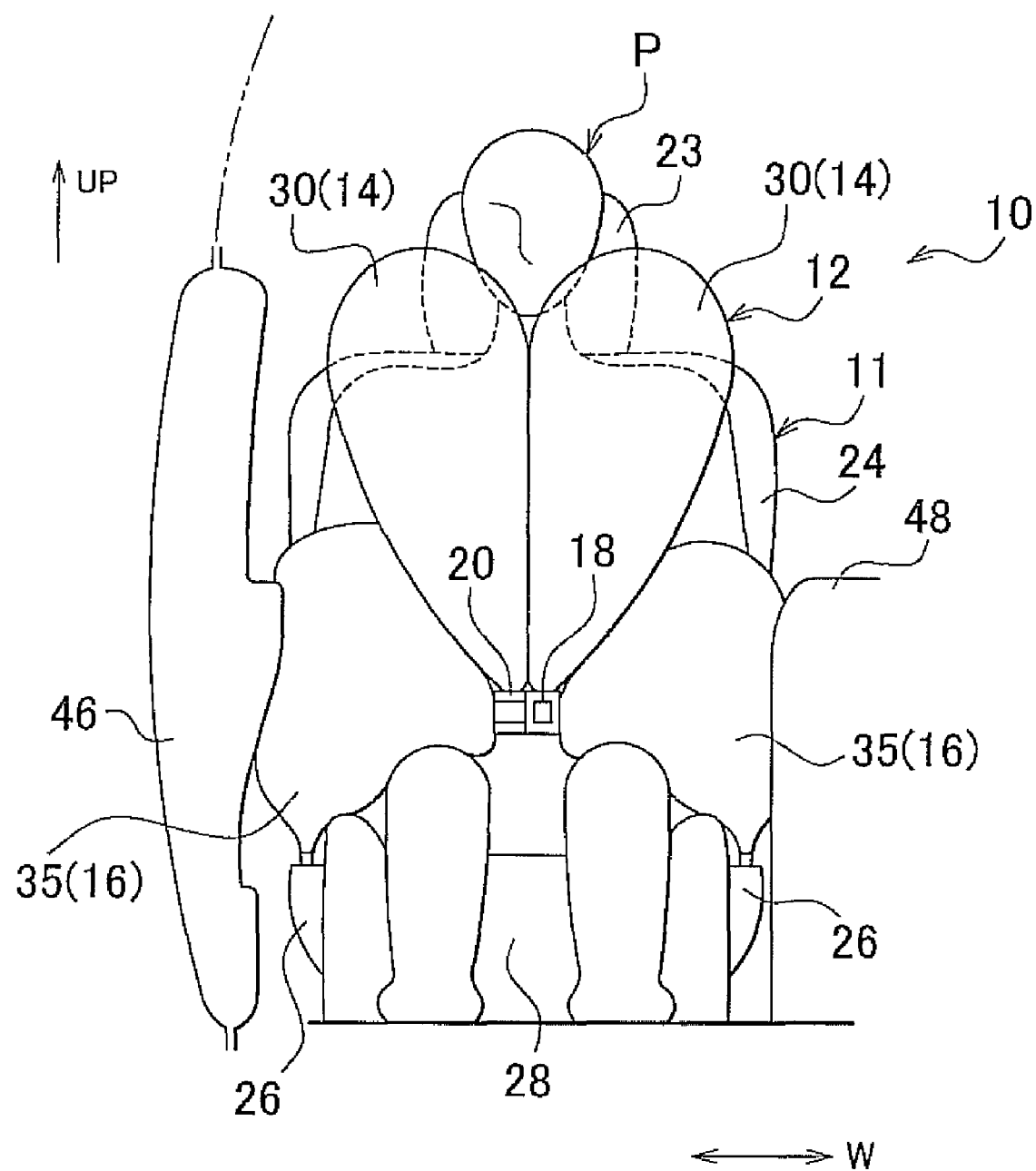
FIG. 1 is a front view of a vehicular occupant restraint system according to a first example embodiment of the invention as it appears when it is activated.

A vehicular occupant restraint system 10 according to a first example embodiment of the invention will now be described with reference to FIGS. 1 and 2. Incidentally, in the drawings, the arrow labeled FR indicates the forward direction (i.e., the direction of travel) of a vehicle provided with this vehicular occupant restraint system 10, which is the same as the forward direction of a vehicle seat (hereinafter simply referred to as "seat") 11 to which the vehicular occupant restraint system 10 is applied. Also, the arrow labeled "UP" indicates the upward direction with respect to the vehicle, which is the same as the upward direction of the seat 11, and the arrow labeled "W" indicates the width direction of the vehicle, which is the same as the width direction of the seat 11. Also, unless otherwise specified, the terms "upper" and "lower" are in reference to the vertical direction of the vehicle and the terms "inside" and "outside" are in reference to the width direction of the seat.

Figure 2A:
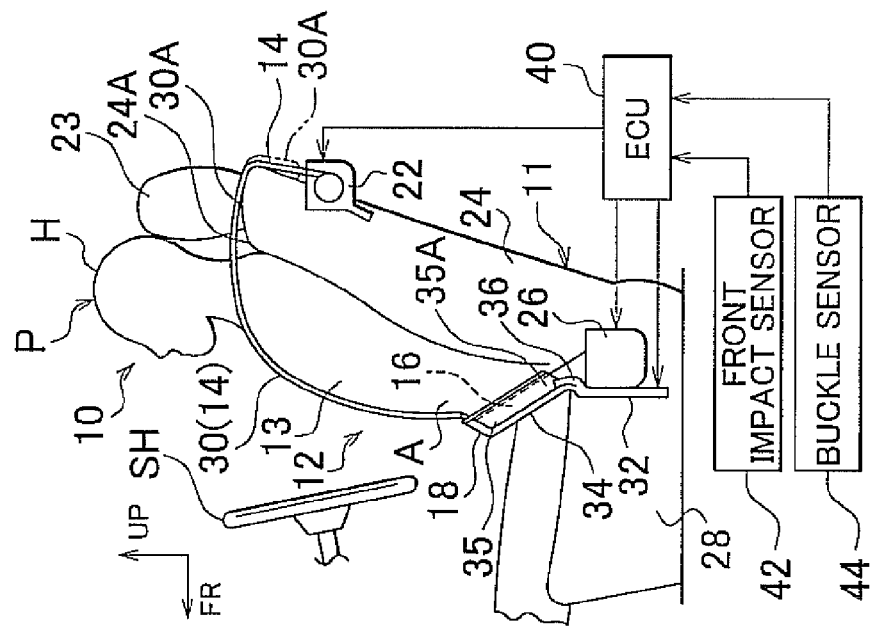
FIG. 2A is a front view of the general overall structure of the vehicular occupant restraint system according to the first example embodiment of the invention.
Figure 2B:
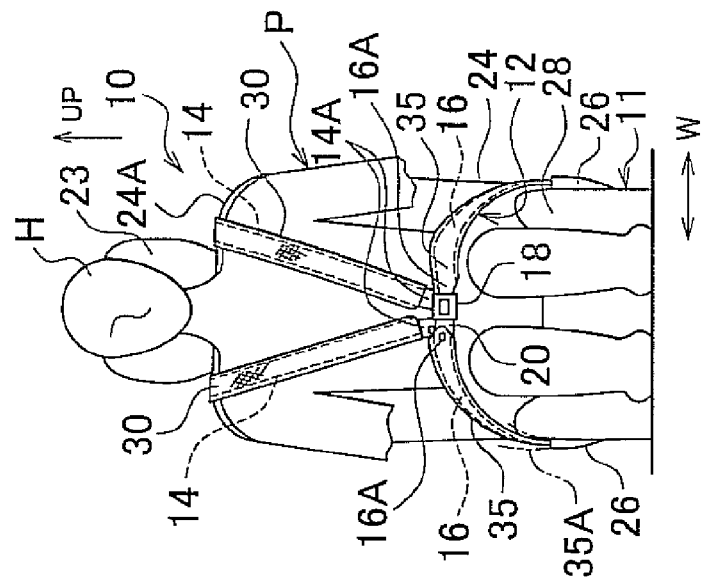
FIG. 2B is a side view of the general overall structure of the vehicular occupant restraint system according to the first example embodiment of the invention.

FIG. 2A is a front view of the general overall structure of the vehicular occupant restraint system 10, and FIG. 2B is a side view of the general overall structure of the vehicular occupant restraint system 10. As shown in the drawings, the vehicular occupant restraint system 10 includes a four-point seatbelt system 12. This four-point seatbelt system 12 has shoulder webbings 14 that serve as left and right upper body restraining portions, and left and right lap webbings 16 that serve as waist restraining portions.

A lower end portion 14A of either the left or right shoulder webbing 14 is connected via a buckle 18 to an inside end portion 16A of the lap webbing 16 that is on the same side of the seat 11 as that shoulder webbing 14. Meanwhile, the lower end portion 14A of the shoulder webbing 14 on the other side is connected, via a tongue plate 20 that detachably fastens to the buckle 18, to the inside end portion 16A of the lap webbing 16 that is on the same side of the seat 11 as that lap webbing 14.

Also, as shown in FIG. 2B, the upper end sides of the shoulder webbings 14 are wound on upper retractors 22 in such a manner that they can be extended and retracted. In this example embodiment, the upper retractors 22 are provided on the back side of a seatback 24 that forms part of the seat 11, and the shoulder webbings 14 slide over upper end surfaces (i.e., the shoulder portions) 24A of the seatback 24 on both sides of a headrest 23 in the seat width direction. In this example embodiment, the left and right shoulder webbings 14 are wound on separate (individual) upper retractors 22, but they may also be wound on a common upper retractor 22.

Meanwhile, the outside ends of the lap webbings 16 are wound on lower retractors 26 in such a manner that they can be extended and retracted. The lower retractors 26 are arranged on lower end portions of the seatback 24 or on the sides of a rear end portion of a seat cushion 28. In the example shown in FIG. 2B, the left and right lap webbings 16 are wound individually on lower retractors 26, but they may also be wound on a common lower retractor 26.

With this four-point seatbelt system 12, as shown in FIGS. 2A and 2B, when the tongue plate 20 is fastened to the buckle 18, the left and right shoulder webbings 14 are worn so as to be able to restrain the upper body of an occupant P from the shoulders to the pelvic area (i.e., the abdomen), while the left and right lap webbings 16 are worn so as to be able to restrain the pelvic area of the occupant P as a unit.

The vehicular occupant restraint system 10 also includes shoulder air belts 30 as first inflating portions that are provided on the left and right shoulder webbings 14. When the occupant P is wearing the shoulder webbings 14, the shoulder air belts 30 extend from the lower end portions 14A of the shoulder webbings 14 to the upper end surfaces 24A of the seatback, as shown in FIG. 2B. When the occupant P is not wearing the shoulder webbings 14, the end portions 30A of the shoulder air belts 30 on the upper retractor 22 sides are positioned directly above the upper retractors 22 (see the alternate long and short two dashes line 30A in FIG. 2B).

The vehicular occupant restraint system 10 also includes lap air belts (waist air belts) 35 as second inflating portions that are provided on both the left and right lap webbings 16. When the occupant P is wearing the shoulder webbings 14, the lap air belts 35 extend from the inside ends of the lap webbings 16 (i.e., the ends with the buckle 18 and the tongue plate 20) to the outside ends of the lap webbings 16 (i.e., near the outside end portion in the width direction of the seat cushion 28), as shown in FIG. 2B. When the occupant P is not wearing the shoulder webbings 14, the outside end portions 35A of the lap air belts 35 are positioned directly above the lower retractors 26 (see the alternate long and short two dashes line 35A in FIG. 2A).

Each of the shoulder air belts 30 and lap air belts 35 are formed of a folded bag that can be inflated and deployed by receiving a supply of gas from inflators 32, which will be described later. Each of these shoulder air belts 30 and lap air belts 35 are covered by a cover that has a seam portion that will break as the bag inflates. The description below will for the most part assume that the shoulder air belts 30 and the lap air belts 35 are deployed.

The inflators 32 are fixed to the seat cushion (frame), as shown in FIG. 2B, for example, and are communicated with the lower portions of the shoulder air belts 30 via flexible tubes 34 and the buckle 18 and the tongue plate 20. Accordingly, in this vehicular occupant restraint system 10, when the inflators 32 are activated, gas is supplied into the shoulder air belts 30 from the lower portions thereof.

Also, in this example embodiment, the inflators 32 are communicated with the lower portions of the lap air belts 35 via flexible tubes 36. Therefore, in this example embodiment, the shoulder air belts 30 and the lap air belts 35 that are on the same side of the seat 11 in the seat width direction are inflated and deployed by receiving a supply of gas from common inflators 32. That is, the left shoulder air belt 30 and the left lap air belt 35 receive gas from one inflator 32, while the right shoulder air belt 30 and the right lap air belt 35 receive gas from another inflator 32. Accordingly, in this example embodiment, the inflators 32, the flexible tubes 34, and the buckle 18 and the tongue plate 20 and the like constitute gas supplying device of the invention, but the gas supplying device (i.e., the number and arrangement of inflators 32 and the path along which gas is supplied to the shoulder air belts 30 and the lap air belts 35) are not limited to this example.

Activation of the inflators 32 is controlled by an ECU 40 which serves as controlling means. This ECU 40 is electrically connected to a front impact sensor 42 for detecting or predicting a front impact to the vehicle provided with the vehicular occupant restraint system 10, and a buckle sensor 44 that outputs a signal indicating that the tongue plate 20 is fastened to the buckle 18. The ECU 40 activates the inflators 32 when it is determined that the tongue plate 20 is fastened to the buckle 18 based on the signal from the buckle sensor 44, and it is determined that a front impact has occurred or is unavoidable based on the signal from the front impact sensor 42.

Furthermore, in this example embodiment, the ECU 40 is also electrically connected to the upper retractors 22 and the lower retractors 26. The ECU 40 activates pretensioners provided in the upper retractors 22 and the lower retractors 26 when it is determined that the tongue plate 20 is fastened to the buckle 18 based on the signal (i.e., a buckle ON signal) from the buckle sensor 44, and it is determined that a front impact has occurred or is unavoidable based on the signal from the front impact sensor 42 (i.e., when a front impact signal is received).

The shoulder air belts 30 that make up part of the vehicular occupant restraint system 10 inflate in front of the upper body of the occupant P, deploying in a predetermined shape, as shown in FIG. 1, when gas is supplied from the inflators 32. As a result, this vehicular occupant restraint system 10 effectively protects the chest in particular of the occupant P during a frontal collision. Also, the lap air belts 35 that make up part of the vehicular occupant restraint system 10 inflate and deploys to the front and side of the pelvic area of the occupant P when gas is supplied from the inflators 32. As a result, with this vehicular occupant restraint system 10, the occupant P is restrained in the seat 11 at the pelvic area by the lap air belts 35 (lap webbings 16).

Also, with this vehicular occupant restraint system 10, the lap air belts 35 are shaped such that, when inflated and deployed, they contact (touch) the shoulder air belts 30, which also inflate and deploy, from the outside in the vehicle width direction, as shown in FIG. 1. That is, with the vehicular occupant restraint system 10 according to this example embodiment, when the shoulder air belts 30 and the lap air belts 35 inflate and deploy to protect the occupant P, the left lap air belt 35 supports the left shoulder air belt 30 from the outside in the seat width direction, and the right lap air belt 35 supports the right shoulder air belt 30 from the outside in the seat width direction.

Also, in this example embodiment, the reaction force of either the left or right lap air belt 35 (the lap air belt 35 on the right side of the occupant in the example shown in FIG. 1) is received by a side door 46 that opens and closes an entrance in the vehicle body to the seat 11. The reaction force of the lap air belt 35 on the other side (the lap air belt 35 on the left side of the occupant in the example shown in FIG. 1) is received by a center console (i.e., a console box) 48 arranged in the center of the vehicle cabin in the vehicle width direction.

Further, if the left shoulder air belt 30 and the left lap air belt 35 in the vehicular occupant restraint system 10 receive gas from one common inflator 32 and the right shoulder air belt 30 and the right lap air belt 35 in the vehicular occupant restraint system 10 receive gas from another common inflator 32, as described above, the lap air belts 35, which are provided nearer (i.e., lower than the shoulder air belts 30) the inflators 32 finish deploying earlier than the shoulder air belts 30. That is, the lap air belts 35 inflate and deploy in a shorter amount of time than the shoulder air belts 30 do once the inflators 32 are activated.

Next, the operation of the first example embodiment will be described.

With the vehicular occupant restraint system 10 having the structure described above, when occupant P seated in the seat 11 fastens the tongue plate 20 to the buckle 18, the left and right shoulder webbings 14 are worn around the upper body of the occupant P and the left and right lap webbings 16 are worn around the pelvic area of the occupant P, as shown in FIGS. 2A and 2B.

The ECU 40 activates the inflators 32 and the pretensioners of the upper retractors 22 and the lower retractors 26 upon receiving a buckle ON signal from the buckle sensor 44 and a front impact signal from the front impact sensor 42. When the inflators 32 and the pretensioners of the upper retractors 22 and the lower retractors 26 are activated, the shoulder webbings 14 and the lap webbings 16 are forcibly retracted by (i.e., wound up on) the upper and lower retractors 22 and 26, thereby restraining the occupant P tightly in the seat 11.

Also, as shown in FIG. 1, gas from the inflators 32 is supplied to the lap air belts 35 via the flexible tubes 36, and to the shoulder air belts 30 via the flexible tubes 34 and the like. Accordingly, the left and right lap air belts 35 start to inflate and deploy first, and then the left and right shoulder air belts 30 start to inflate and deploy.

Here, with the vehicular occupant restraint system 10, the lower portions on the outside in the seat width direction of the shoulder air belts 30 are supported by the inflated and deployed lap air belts 35, as shown in FIG. 1, which helps to keep the shoulder air belts 30 in position with respect to the occupant P in the seat width direction. That is, as the left and right shoulder air belts 30 inflate and deploy, forces may act to displace them toward the outside in the seat width direction with respect to the occupant P. More specifically, as the left and right shoulder air belts 30 inflate and deploy, they tend to push each other toward the outside. In addition, the reaction force from the head of the occupant P, together with the effect of the sloping of the shoulders of the occupant P, also tends to displace the shoulder air belts 30 toward the outside. However, supporting the shoulder air belts 30 from the outside by the lap air belts 35 as this vehicular occupant restraint system 10 does helps to keep them from being displaced in the seat width direction with respect to the occupant P, as described above. As a result, in this vehicular occupant restraint system 10, the shoulder air belts 30 inflate and deploy in the proper positions with respect to the occupant P (i.e., they are kept in the proper deployed states).

In particular, with the vehicular occupant restraint system 10, the shoulder air belts 30 can be effectively supported in the seat width direction by the lap air belts 35 that completely inflate and deploy before the shoulder air belts 30 do. Therefore, the shoulder air belts 30 are kept from becoming displaced in the seat width direction with respect to the occupant P. Also with this vehicular occupant restraint system 10, the left and right shoulder air belts 30 are supported from the outside in the seat width direction by the corresponding left and right lap air belts 35, which effectively helps to keep the left and right shoulder air belts 30 in position in the seat width direction with respect to the occupant P.

In this way, the vehicular occupant restraint system 10 according to this first example embodiment is able to effectively protect the occupant P with the shoulder air belts 30 provided on the shoulder webbings 14 that make up part of the four-point seatbelt system.

Also, because in the vehicular occupant restraint system 10 the shoulder air belts 30 are able to be supported in the seat width direction by the lap air belts 35 which restrain the pelvic area the occupant P, as described above, it is possible to keep the shoulder air belts 30 in their proper positions (i.e., keep the shoulder air belts 30 from becoming displaced) with respect to the occupant P, without using (adding) a special part to do so.

In addition, with the vehicular occupant restraint system 10, the lap air belts 35 are provided on the lap webbings 16 that make up part of the four-point seatbelt system 12. Therefore, in the four-point seatbelt system 12, the shoulder air belts 30 that protect the upper body of the occupant P, the lap air belts 35 that restrain the pelvic area of the occupant P into the four-point seatbelt system, and the lap air belts 35 support the shoulder air belts 30 can be simplified. Also, providing the shoulder air belts 30 and the lap air belts 35 on the shoulder webbings 14 and the lap webbings 16 which follow the seat 11 at it slides with respect to the vehicle body obviates the need for, or simplifies, a structure for allowing the seat 11 to slide.

Furthermore, with the vehicular occupant restraint system 10, the lap air belts 35 inflate and deploy before the shoulder air belts 30 do. Therefore, during a frontal collision, the lap air belts 35 first inflate and deploy to firmly restrain the pelvic area of the occupant P, after which the shoulder air belts 30 deploy in a predetermined shape in an appropriate position in front of the occupant P while being supported from the outside in the seat width direction by the lap air belts 35. As a result, the shoulder air belts 30 are able to even more effectively protect the upper body of the occupant P.

Next, a second example embodiment of the invention will be described. Incidentally, portions and parts in this second example embodiment that are basically the same as portions and parts in the first example embodiment described above will be denoted by the same reference characters that are used in the first example embodiment. Descriptions of those portions and parts may be omitted, and the reference characters of those portions and parts may be omitted in the drawings.

Figure 3:
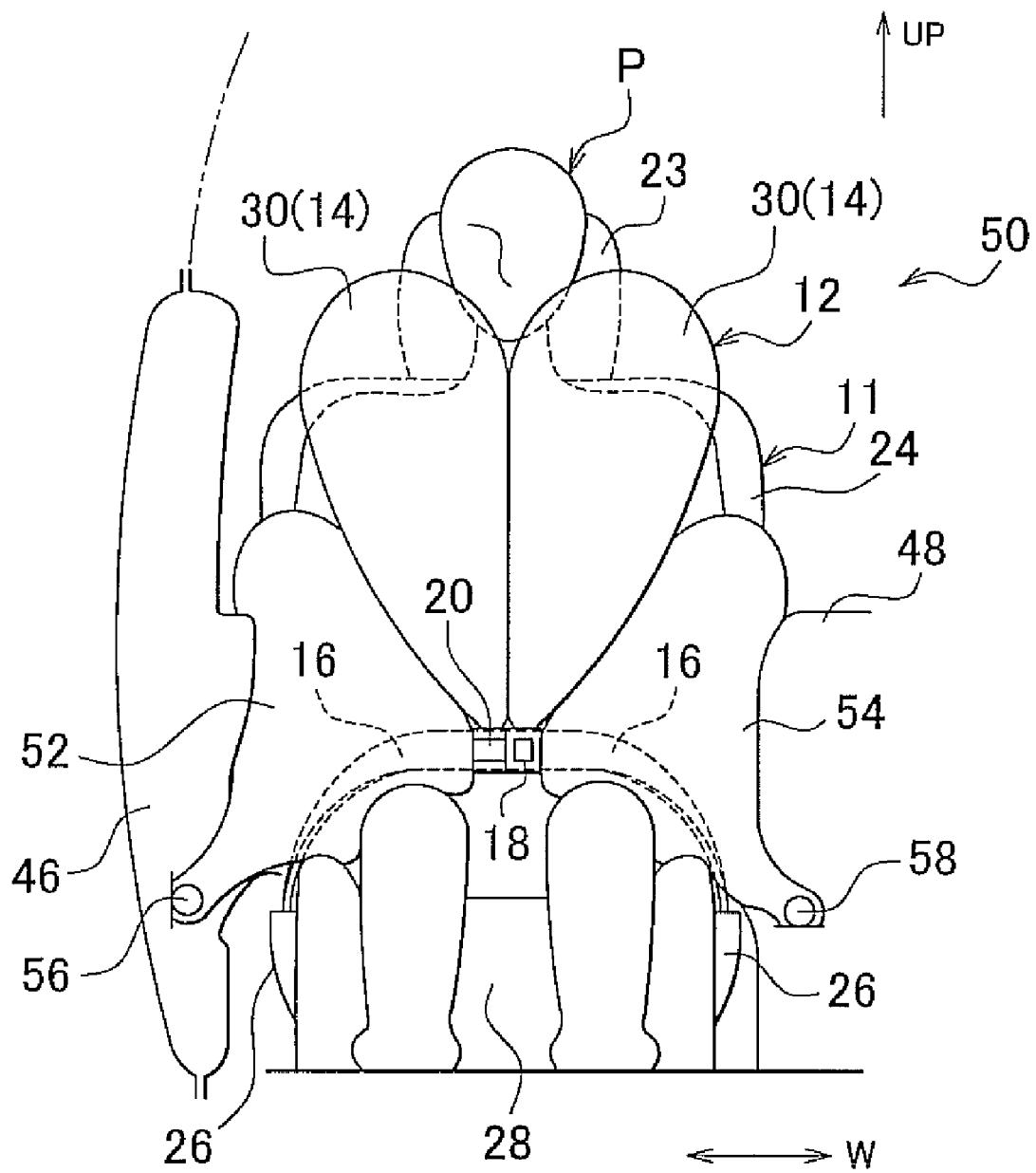
FIG. 3 is a front view of a vehicular occupant restraint system according to a second example embodiment of the invention as it appears when it is activated.

FIG. 3 is a front view of a vehicular occupant restraint system 50 according to this second example embodiment of the invention as it appears when it is activated, which corresponds to FIG. 1. As shown in the drawing, the vehicular occupant restraint system 50 differs from the vehicular occupant restraint system 10 in the first example embodiment in that it has a door-mounted airbag 52 and a console-mounted airbag 54 as second inflating portions, instead of the lap air belts 35 provided on the lap webbings 16 that make up part of the four-point seatbelt system 12.

The door-mounted airbag 52 is arranged folded, not shown, in (the door trim of) a side door 46, and inflates and deploys as shown in FIG. 3 by receiving a supply of gas from an inflator 56 arranged in the side door 46. The console-mounted airbag 54 is arranged folded, not shown, in the center console 48, and inflates and deploys as shown in FIG. 3 by receiving a supply of gas from an inflator 58 arranged in the center console 48. The door-mounted airbag 52 and the console-mounted airbag 54 are designed to restrain the pelvic area of the occupant P when inflated and deployed.

With this vehicular occupant restraint system 50, the door-mounted airbag 52 and the console-mounted airbag 54 are shaped such that, when inflated and deployed, they contact the shoulder air belt 30, which inflates and deploys on the same side of the seat 11 in seat width direction, from the outside in the seat width direction, as shown in FIG. 3. That is, with the vehicular occupant restraint system 50 according to this example embodiment, when the shoulder air belts 30, the door-mounted airbag 52, and the console-mounted airbag 54 inflate and deploy to protect the occupant P, the door-mounted airbag 52 and the console-mounted airbag 54 support the corresponding shoulder air belts 30 from the outside in the seat width direction.

Also, with the vehicular occupant restraint system 50, the reaction force of the door-mounted airbag 52 is received by the side door 46 and the reaction force of the console-mounted airbag 54 is received by the center console 48, as shown in FIG. 3.

Further, with the vehicular occupant restraint system 50, the shoulder air belts 30 receive a supply of gas from the inflators 32 via the flexible tubes 34 and the like, while the door-mounted airbag 52 and the console-mounted airbag 54 receive a supply of gas from the inflators 56 and 58, respectively, as described above.

With the vehicular occupant restraint system 50, the ECU 40 controls the activation timing of the inflators 32 and the inflators 56 and 58 so that the door-mounted airbag 52 and the console-mounted airbag 54 inflate and deploy before the shoulder air belts 30 do. That is, when it is determined that the tongue plate 20 is fastened to the buckle 18 based on the signal from the buckle sensor 44, and it is determined that a front impact has occurred or is unavoidable based on the signal from the front impact sensor 42, the ECU 40 first activates the inflators 56 and 58 and then activates the inflators 32 a predetermined period of time later. The other structure of the vehicular occupant restraint system 50 is the same as the corresponding structure of the vehicular occupant restraint system 10 of the first example embodiment.

Therefore, the vehicular occupant restraint system 50 according to this second example embodiment is able to protect the occupant P with the same effectiveness as the vehicular occupant restraint system 10 according to the first example embodiment by basically the same operation as that of the vehicular occupant restraint system 10.

Also, in the vehicular occupant restraint system 50, the shoulder air belts 30 can be supported in the seat width direction by the door-mounted airbag 52 and the console-mounted airbag 54 which restrain the pelvic area of the occupant P. Therefore, it is possible to keep the shoulder air belts 30 in their proper positions (i.e., keep the shoulder air belts 30 from becoming displaced) with respect to the occupant P, without using (adding) a special part to do so.

In particular, with the vehicular occupant restraint system 50, the door-mounted airbag 52 and the console-mounted airbag 54 deploy toward the center of the seat 11 in the seat width direction from the side door 46 and the center console 58 which are on the outside of the seat 11 in the seat width direction. Therefore, the shoulder air belts 30 are able to be effectively supported from the outside in the seat width direction by the door-mounted airbag 52 and the console-mounted airbag 54.

Next, a third example embodiment of the invention will be described. Incidentally, portions and parts in this third example embodiment that are basically the same as portions and parts in the first example embodiment described above will be denoted by the same reference characters that are used in the first example embodiment. Descriptions of those portions and parts may be omitted, and the reference characters of those portions and parts may be omitted in the drawings.

Figure 4A:
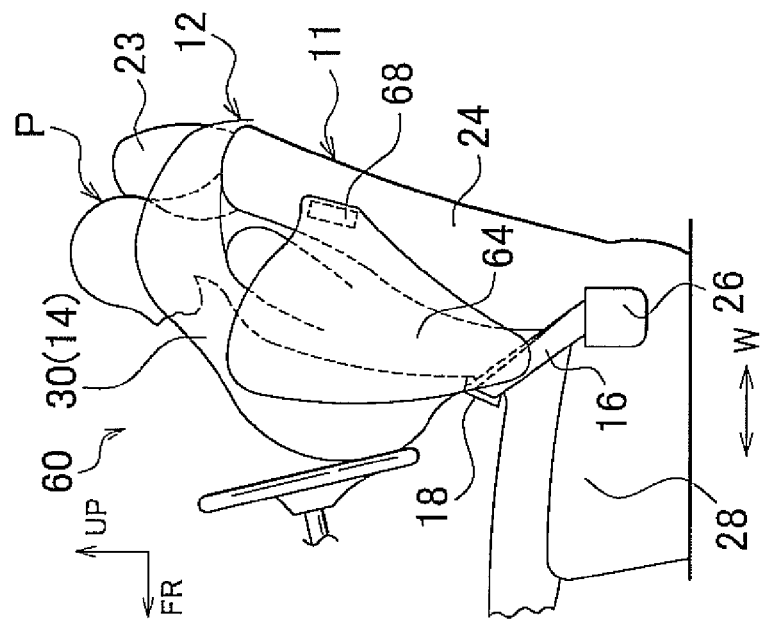
FIG. 4A is a front view of the general overall structure of a vehicular occupant restraint system according to a third example embodiment of the invention as it appears when it is activated.
Figure 4B:
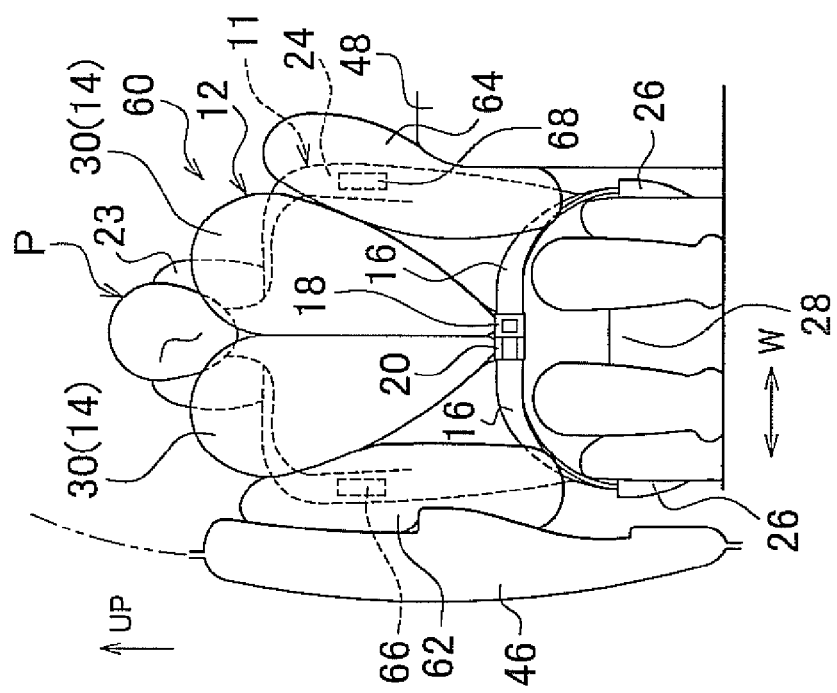
FIG. 4B is a side view of the vehicular occupant restraint system according to the third example embodiment of the invention.

FIG. 4A is a front view of a vehicular occupant restraint system 60 according to this third example embodiment of the invention as it appears when it is activated, which corresponds to FIG. 1. FIG. 4B is a side view of the vehicular occupant restraint system 60. As shown in the drawings, the vehicular occupant restraint system 60 differs from the vehicular occupant restraint system 10 according to the first example embodiment in that it has an outer side airbag 62 and an inner side airbag 64 as second inflating portions, instead of the lap air belts 35 provided on the lap webbings 16 that make up part of the four-point seatbelt system 12.

The outer side airbag 62 is arranged folded, not shown, in an outside end portion (on the side door 46 side) in the vehicle width direction in the seatback 24 that forms part of the seat 11, and inflates and deploys as shown in FIG. 4A by receiving a supply of gas from an inflator 66 arranged in the seatback 24. The inner side airbag 64 is arranged folded, not shown, in an inside end portion (on the center console 48 side) in the vehicle width direction in the seatback 24, and inflates and deploys as shown in FIGS. 4A and 4B by receiving a supply of gas from an inflator 68 arranged in the seatback 24.

During a side collision, for example, the outer side airbag 62 inflates and deploys between the occupant P and the side door 46 to protect the occupant P from the side collision. Similarly, during a side collision, for example, the inner side airbag 64 inflates and deploys between the occupant P and the (occupant P in the) seat 11 next to the occupant P in the vehicle width direction to protect the occupant P from the side collision.

With this vehicular occupant restraint system 60, the outer side airbag 62 and the inner side airbag 64 are shaped such that, when inflated and deployed, they contact the same-side shoulder air belts 30, which also inflate and deploy, from the outside in the vehicle width direction, as shown in FIG. 4A. That is, with the vehicular occupant restraint system 60 according to this example embodiment, when the shoulder air belts 30 inflate and deploy to protect the occupant from a front impact, the outer side airbag 62 and the inner side airbag 64 support the corresponding shoulder air belts 30 from the outside in the seat width direction.

Also, with the vehicular occupant restraint system 60, the reaction force of the outer side airbag 62 is received by the side door 46 and the reaction force of the inner side airbag 64 is received by the center console 48, as shown in FIG. 4A. Incidentally, an airbag that is able to support the shoulder air belt 30 independently (i.e., without relying on the vehicle body or a member inside the vehicle cabin) may also be used as the inner side airbag 64.

Moreover, with the vehicular occupant restraint system 60, the shoulder air belt 30 receives a supply of gas from the inflators 32 via the flexible tubes 34 and the like, while the outer side airbag 62 and the inner side airbag 64 receive a supply of gas from the inflators 66 and 68, respectively, as described above.

With this vehicular occupant restraint system 60, the ECU 40 controls the activation timing of the inflators 32 and the inflators 66 and 68 so that the outer side airbag 62 and the inner side airbag 64 inflate and deploy before the shoulder air belts 30 do. That is, when it is determined that the tongue plate 20 is fastened to the buckle 18 based on the signal from the buckle sensor 44, and it is determined that a front impact has occurred or is unavoidable based on the signal from the front impact sensor 42, the ECU 40 first activates the inflators 66 and 68 and then activates the inflators 32 a predetermined period of time later.

Also, when it is determined that the tongue plate 20 is fastened to the buckle 18 based on the signal from the buckle sensor 44, and it is determined that a front impact has occurred or is unavoidable based on the signal from the front impact sensor 42, the ECU 40 that makes up part of this vehicular occupant restraint system 60 activates the inflators 66 and 68 to inflate and deploy the outer side airbag 62 and the inner side airbag 64, respectively.

Therefore, the vehicular occupant restraint system 60 according to this third example embodiment is able to protect the occupant P with the same effectiveness as the vehicular occupant restraint system 10 according to the first example embodiment by basically the same operation as that of the vehicular occupant restraint system 10.

Also, in the vehicular occupant restraint system 60, during a side impact, the shoulder air belts 30 can be supported in the seat width direction by the outer side airbag 62 and the inner side airbag 64 which protect the occupant P from a side collision. Therefore, it is possible to keep the shoulder air belts 30 in their proper positions (i.e., keep the shoulder air belts 30 from becoming displaced) with respect to the occupant P, without using (adding) a special part to do so.

Incidentally, FIG. 4B shows an example in which the lower portions of the shoulder air belts 30 are inflated and deployed to a great extent in the longitudinal direction of the vehicle to protect the occupant P from the steering wheel SH. However, the shoulder air belts 30 may take on other forms according to the seat 11 to which they are applied.

Next, a fourth example embodiment of the invention will be described. Incidentally, portions and parts in this fourth example embodiment that are basically the same as portions and parts in the third example embodiment described above will be denoted by the same reference characters that are used in the third example embodiment. Descriptions of those portions and parts may be omitted, and the reference characters of those portions and parts may be omitted in the drawings.

Figure 5A:
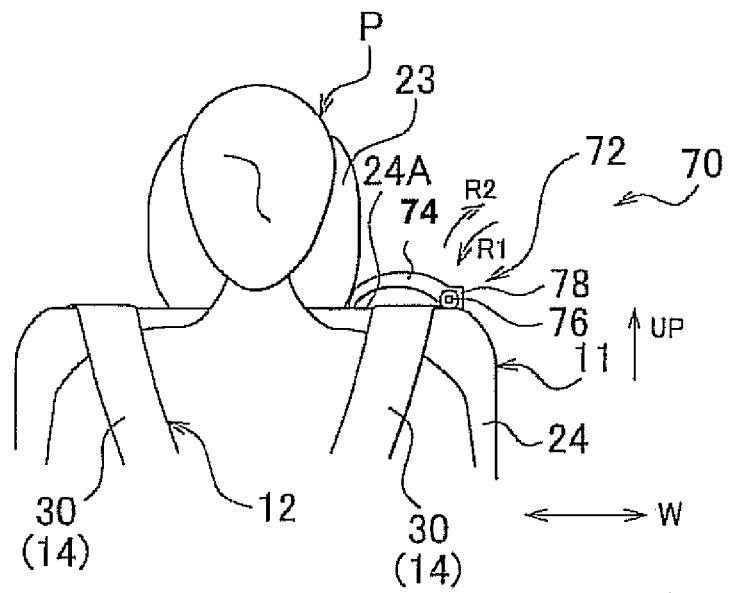
FIG. 5A is a front view of the main portion of a vehicular occupant restraint system according to a fourth example embodiment of the invention as it appears when it is not activated.
Figure 5B:
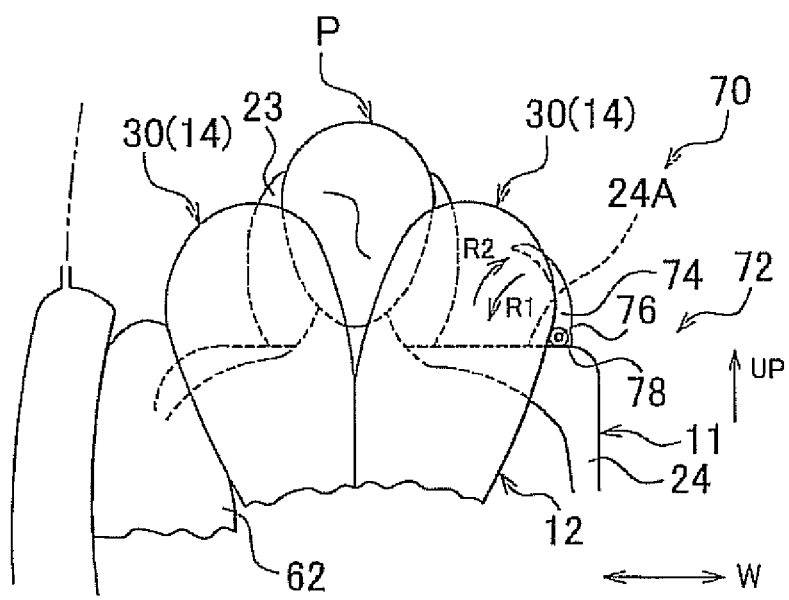
FIG. 5B is a front view of the main portion of the vehicular occupant restraint system according to the fourth example embodiment of the invention as it appears when it is activated.

FIG. 5A is a front view of the main portion of a vehicular occupant restraint system 70 according to the fourth example embodiment of the invention as it appears when it is not activated, and FIG. 5B is a front view of the main portion of the vehicular occupant restraint system 70 as it appears when it is activated. As shown in the drawings, the vehicular occupant restraint system 70 differs from the vehicular occupant restraint system 60 in the third example embodiment in that it has a belt guide 72 for guiding the shoulder air belt 30 (i.e., the shoulder webbing 14) that is on the inside in the vehicle width direction, instead of the inner side airbag 64.

The belt guide 72 is provided on an upper end surface 24A that forms the shoulder portion on the inside of the upper end surface of the seatback 24 in the vehicle width direction, and creates a space through which the shoulder air belt 30 can pass between the belt guide 72 and the upper end surface 24A of the seatback 24. More specifically, the belt guide 72 has a guide main body 74, a shaft supporting portion 76, and a guide maintaining portion, not shown. The guide main body 74 is formed in a bowed shape (i.e., an inverted U-shape) such that it arches away from the upper end surface 24A of the seatback 24. The shaft supporting portion 76 supports an outer end portion of the guide main body 74 in the seat width direction so that it can pivot around a shaft that extends in the longitudinal direction of the vehicle. The guide maintaining portion keeps the inside end of the guide main body 74 in the seat width direction in contact with the upper end surface 24A of the seatback 24. While the guide main body 74 is being kept in position by the guide maintaining portion, the shoulder air belt 30 passes through the space formed between the guide main body 74 and the upper end surface 24A of the seatback 24, such that the shoulder air belts 30 (i.e., the shoulder webbings 14) are kept in the correct positions with respect to the occupant P (i.e., thereby inhibiting the shoulder air belts 30 from becoming displaced with respect to the occupant P).

The guide maintaining portion may for example be in the form of a spring that urges the guide main body 74 in the direction of arrow R1 in FIG. 5A, or it may be in the form as a fastener or grip that is released when a load of a predetermined value or greater is applied to it. Accordingly, with the belt guide 72, when the shoulder air belt 30 is inflated, the guide main body 74 pivots about the shift supporting portion 76 so as not to obstruct the shoulder air belt 30 from properly inflating.

Also, a stopper 78 is formed on the end portion that is on the shaft supporting portion 76 side of the guide main body 74. When the guide main body 74 pivots a predetermined angle in the direction of arrow R2 about the shaft supporting portion 76, this stopper 78 abuts against the upper end surface 24A of the seatback 24, thereby preventing the guide main body 74 from pivoting beyond that predetermined angle in the direction of arrow R2. In this position, i.e., when the guide main body 74 is pivoted as far as it is allowed in the direction of arrow R2 in this way, it stands vertical on the upper end surface 24A of the seatback 24 and supports the inflated shoulder air belt 30 from the outside in the seat width direction. This upright position of this guide main body 74 will hereinafter be referred to as the air belt supporting position of the guide main body 74. The other structure of the vehicular occupant restraint system 70 is the same as the corresponding structure of the vehicular occupant restraint system 60 (and vehicular occupant restraint system 10).

With the vehicular occupant restraint system 70 having the structure described above, the ECU 40 activates the inflator 66 and the inflators 32 in order when it is determined that the tongue plate 20 is fastened to the buckle 18 based on the signal from the buckle sensor 44, and it is determined that a front impact has occurred or is unavoidable based on the signal from the front impact sensor 42. When the inflators 66 and 32 are activated, the outer side airbag 62 inflates and deploys before the shoulder air belts 30 do, and thus acts to support the shoulder air belt 30 that is on the outside in the vehicle width direction from the outside in the seat width direction.

Meanwhile, as the shoulder air belt 30 that is on the inside in the vehicle width direction inflates and deploys, it causes the guide main body 74 of the belt guide 72 to pivot into the air belt supporting position, which inhibits that shoulder air belt 30 from moving toward the outside in the seat width direction.

As described above, the vehicular occupant restraint system 70 according to this fourth example embodiment is able to protect the occupant P with the same effectiveness as the vehicular occupant restraint system 60 according to the third example embodiment (and the vehicular occupant restraint system 10 according to the first example embodiment) by basically the same operation as that of the vehicular occupant restraint system 60 (and the vehicular occupant restraint system 10). That is, the second inflating portion of the invention does not necessarily have to be provide on both the left and right corresponding to the left and right first inflating portions (i.e., the shoulder air belts 30) as long as it supports either the left or the right first inflating portion from the outside in the vehicle width direction.

Next, a fifth example embodiment of the invention will be described. Incidentally, portions and parts in this fifth example embodiment that are basically the same as portions and parts in the first example embodiment described above will be denoted by the same reference characters that are used in the first example embodiment. Descriptions of those portions and parts may be omitted, and the reference characters of those portions and parts may be omitted in the drawings.

Figure 6:
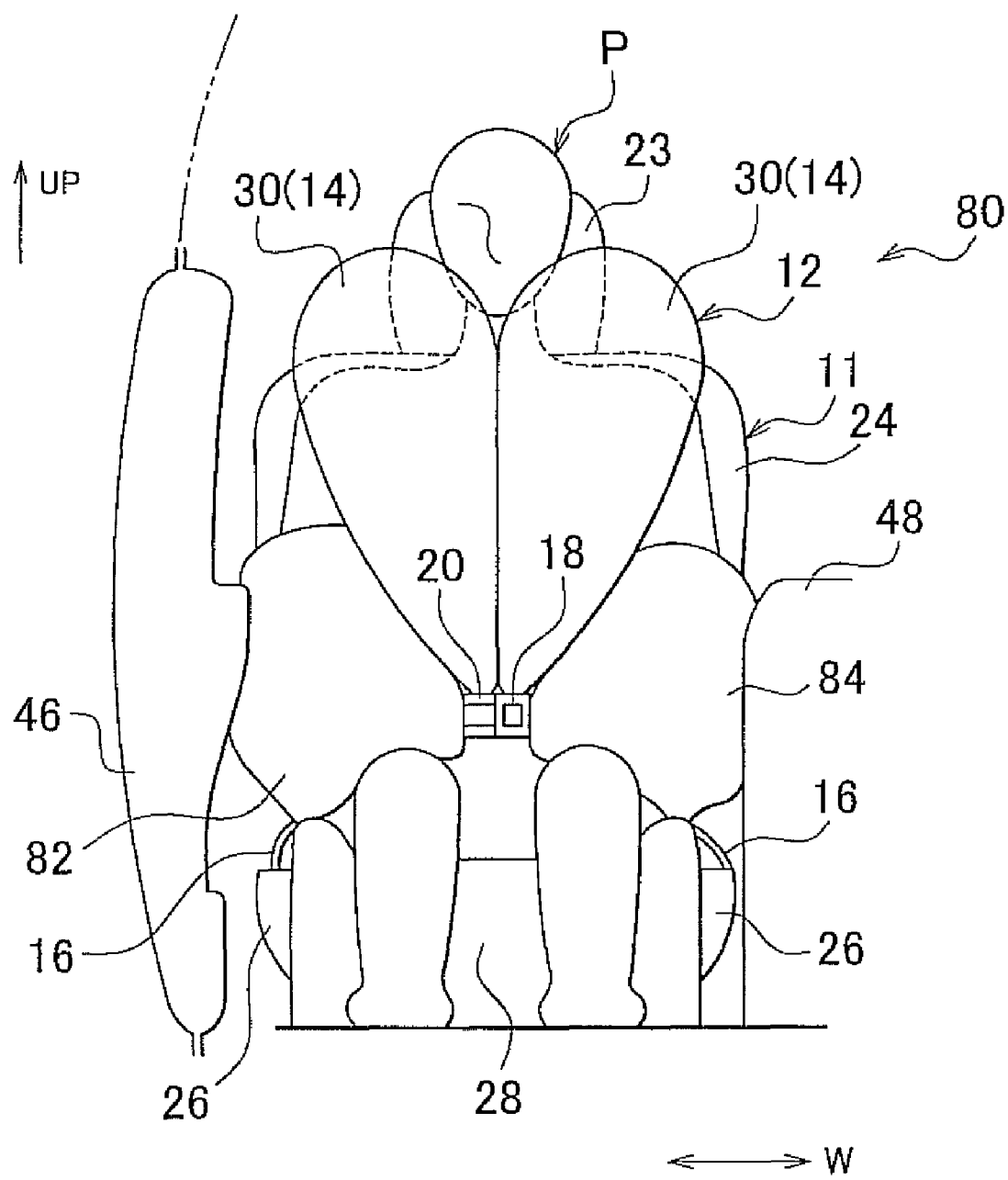
FIG. 6 is a front view of a vehicular occupant restraint system according to a fifth example embodiment of the invention as it appears when it is activated.

FIG. 6 is a front view of a vehicular occupant restraint system 80 according to the fifth example embodiment of the invention as it appears when it is activated, which corresponds to FIG. 1 of the first example embodiment. As shown in the drawing, the vehicular occupant restraint system 80 differs from the vehicular occupant restraint system 10 in the first example embodiment in that it has a cushion outer airbag 82 and a cushion inner airbag 84 as second inflating portions, instead of the lap air belts 35 provided on the lap webbings 16 that make up part of the four-point seatbelt system 12.

The cushion outer airbag 82 is arranged folded, not shown, in an outside end portion (on the side door 46 side) in the vehicle width direction in the seat cushion 28 that forms part of the seat 11, and inflates and deploys as shown in FIG. 6 by receiving a supply of gas from an inflator, not shown, arranged in or underneath the seat cushion 28. The cushion inner airbag 84 is arranged folded, not shown, in an inside end portion (on the center console 48 side) in the vehicle width direction in the seat cushion 28, and inflates and deploys as shown in FIG. 6 by receiving a supply of gas from an inflator, not shown, arranged in or underneath the seat cushion 28. The cushion outer airbag 82 and the cushion inner airbag 84 are designed to restrain the pelvic area of the occupant P when inflated and deployed.

With this vehicular occupant restraint system 80, the cushion outer airbag 82 and the cushion inner airbag 84 are shaped such that, when inflated and deployed, they contact the shoulder air belt 30, which inflates and deploys on the same side of the seat 11 in seat width direction, from the outside in the seat width direction, as shown in FIG. 6. That is, with the vehicular occupant restraint system 80 according to this example embodiment, when the shoulder air belts 30 inflate and deploy to protect the occupant P, the cushion outer airbag 82 and the cushion inner airbag 84 support the corresponding shoulder air belts 30 from the outside in the seat width direction.

Also, with the vehicular occupant restraint system 80, the reaction force of the cushion outer airbag 82 is received by the side door 46 and the reaction force of the cushion inner airbag 84 is received by the center console 48, as shown in FIG. 6.

Further, with the vehicular occupant restraint system 80, the shoulder air belts 30 receive a supply of gas from the inflators 32 via the flexible tubes 34 and the like, while the cushion outer airbag 82 and the cushion inner airbag 84 receive a supply of gas from corresponding inflators, as described above.

With the vehicular occupant restraint system 80, the ECU 40 controls the activation timing of the inflators, including the inflators 32, so that the cushion outer airbag 82 and the cushion inner airbag 84 inflate and deploy before the shoulder air belts 30 do. That is, when it is determined that the tongue plate 20 is fastened to the buckle 18 based on the signal from the buckle sensor 44, and it is determined that a front impact has occurred or is unavoidable based on the signal from the front impact sensor 42, the ECU 40 first activates the inflators for the cushion outer airbag 82 and the cushion inner airbag 84 and then activates the inflators 32 a predetermined period of time later.

Also, when it is determined that the tongue plate 20 is fastened to the buckle 18 based on the signal from the buckle sensor 44, and it is determined that a front impact has occurred or is unavoidable based on the signal from the front impact sensor 42, the ECU 40 that makes up part of this vehicular occupant restraint system 80 activates the inflators for the cushion outer airbag 82 and the cushion inner airbag 84 to inflate and deploy the cushion outer airbag 82 and the cushion inner airbag 84, respectively. The other structure of the vehicular occupant restraint system 80 is the same as the corresponding structure of the vehicular occupant restraint system 10 of the first example embodiment.

Therefore, the vehicular occupant restraint system 80 according to this fifth example embodiment is able to protect the occupant P with the same effectiveness as the vehicular occupant restraint system 10 according to the first example embodiment by basically the same operation as that of the vehicular occupant restraint system 10.

Also, in the vehicular occupant restraint system 80, during a side impact, the shoulder air belts 30 can be supported in the seat width direction by the cushion outer airbag 82 and the cushion inner airbag 84 which protect the occupant P from a side collision. Therefore, it is possible to keep the shoulder air belts 30 in their proper positions (i.e., keep the shoulder air belts 30 from becoming displaced) with respect to the occupant P, without using (adding) a special part to do so.

Incidentally, instead of the cushion outer airbag 82, during a side collision, for example, a side airbag that inflates and deploys between the occupant P and the side door 46 to protect the occupant P from the side collision may be inflated and deployed from the outside portion of the seat cushion 28. Similarly, instead of the cushion inner airbag 84, during a side collision, for example, a side airbag that inflates and deploys between the occupant P and the (occupant P in the) seat 11 next to the occupant P in the vehicle width direction to protect the occupant P from the side collision may be inflated and deployed from the inside portion of the seat cushion 28.

Incidentally, while five example embodiments have been described above, the invention is not limited to these example embodiments. That is, various modifications are also possible.

For example, in the first example embodiment, the shoulder air belts 30 and the lap air belts 35 may receive a supply of gas individually from separate inflators. In this case, the inflators for the lap air belts 35 can be activated first and then the inflators for the shoulder air belts 30 can be activated, as in the second and third example embodiments. Also, in this case, the inflators that supply gas to the shoulder air belts 30 can be provided in the seatback. Also, a common inflator can be used for the left and right shoulder air belts 30, a common inflator can be used for the left and right lap belts 35 (the door-mounted airbag 52, the console-mounted airbag 54, the outer side airbag 62, and the inner side airbag 64), or a common inflator can be used for all four air belts, i.e., the two shoulder air belts 30 and the two lap air belts 35 (the door-mounted airbag 52, the console-mounted airbag 54, the outer side airbag 62, and the inner side airbag 64).

Also, in the example embodiments described above, the four-point seatbelt system 12 has the upper retractors 22 and the lower retractors 26, but the invention is not limited to this. For example, an anchor may be provided instead of the upper retractors 22 or the lower retractors 26 by forming the shoulder webbings 14 and the lap webbings 16 out of a single continuous piece of webbing, and slidably providing the buckle 18 and the tongue plate 20 on this single piece of webbing. Also, the upper retractors 22 and the lower retractors 26 have a pretensioner function, but the invention is not limited to this. For example, the pretensioner function may be realized by shortening the shoulder webbings 14 in the length direction by deploying the shoulder air belts 30.

Furthermore, in the example embodiments described above, the invention is applied to the seat 11 that is offset from the center of the vehicle cabin in the vehicle width direction and separated from the adjacent seat by the center console 48. However, the invention is not limited to this. For example, the invention may also be applied to a bench seat or a seat or the like that is arranged in the center of the vehicle cabin in the vehicle width direction. That is, the invention is not limited to being applied to the first row of seats, but may also be applied to a second row of seats as well seats therebehind. Also, in the second, third, and fifth example embodiments described above, the reaction force of the console-mounted airbag 54, the inner side airbag 64, and the cushion inner airbag 84, which all serve as the second inflating portion, is received by the center console 48, but the invention is not limited to this. That is, the reaction force of the second inflating portion may also be received by another method (structure).

In the example embodiments described above, the second inflating portion may be gathered as a single portion. For example, in the first embodiment, the lap air belts 35 formed on the lap webbings 16 may be a single lap air belt.

In the example embodiments described above, the center console 48 may include an armrest (not shown).

In the vehicular occupant restraint system of the invention, the second inflating portion may be set to finish deploying before the first inflating portions finish deploying.

Accordingly, the first inflating portions are able to be effectively supported in the seat width direction by the second inflating portion that has finished deploying before the first inflating portions have. As a result, the first inflating portions are able to be more effectively kept in position (i.e., more effectively kept from becoming displaced) with respect to the occupant in the seat width direction.

In the vehicular occupant restraint system of the invention, the second inflating portion may include a left second inflating portion to support the left first inflating portion from the outside in the seat width direction by inflating when the left first inflating portion inflates, and a right second inflating portion to support the right first inflating portion from the outside in the seat width direction by inflating when the right first inflating portion inflates.

Accordingly, the right and left first inflating portions can be effectively supported in the seat width direction because they are supported in that direction by the corresponding second inflating portions. As a result, the first inflating portions are able to be more effectively kept in position (i.e., more effectively kept from becoming displaced) with respect to the occupant in the seat width direction.

In the vehicular occupant restraint system of the invention, the second inflating portion may function to restrain the pelvic area of the occupant by inflating.

Accordingly, the first inflating portions can be supported in the seat width direction by the second inflating portion that restrains the pelvic area of the occupant. Therefore, it is possible to keep the first inflating portions in the proper position (i.e., keep the first inflating portions from becoming displaced) with respect to the occupant, without using (adding) a special part to do so. In particular, with the structure in which the second inflating portion deploys before the first inflating portions do, the pelvic area of the occupant can be restrained first and then the first inflating portions can be deployed in a predetermined shape in front of the upper body of the occupant, such that the occupant is well protected.

In the vehicular occupant restraint system of the invention, the left and right webbings may each have a waist restraining portion that restrains the pelvic area of the occupant, and the second inflating portion may be provided on the waist restraining portions of the webbings.

Accordingly, the right and left webbings of the four-point seatbelt system each have an upper body restraining portion and a waist restraining portion. The first inflating portions provided on the left and right upper body restraining portions are supported in the seat width direction by the second inflating portions provided on the left and right waist portions. As a result, with this vehicular occupant restraint system, the occupant can effectively be restrained by a simple structure in which four inflating portions are provided in the four-point seatbelt system.

In the vehicular occupant restraint system of the invention, the second inflating portion may also be provided in a portion that constitutes a member provided in the vehicle cabin or an inside wall of the vehicle cabin.

Accordingly, because the second inflating portion is provided in a portion that constitutes a member provided in the vehicle cabin or an inside wall of the vehicle cabin, the second inflating portion is able to inflate and deploy from the outside (i.e., on the outside) in the seat width direction with respect to the seat. As a result, the first inflating portions can be effectively supported from the outside in the seat width direction by the second inflating portion.

In the vehicular occupant restraint system of the invention, the second inflating portion may include a second inflating portion that is provided in a side door and a second inflating portion that is provided in a center console or an armrest.

Accordingly, the first inflating portion on the outside in the vehicle width direction is supported by the second inflating portion provided in the side door (inside wall of the vehicle cabin), and the first inflating portion on the inside in the vehicle width direction is supported by the second inflating portion provided in the center console (a member inside the vehicle cabin). Therefore, in a vehicular occupant restraint system that is applied to a seat that is arranged offset with respect to the center in the vehicle width direction in the vehicle cabin, the first inflating portions can be effectively supported from the outside in the seat width direction by the second inflating portions.

In the vehicular occupant restraint system of the invention, the second inflating portion may also be provided in a side portion of the seatback.

Accordingly, the first inflating portion on the outside in the vehicle width direction is supported by the second inflating portion provided on the side portion of the seatback (a member in the vehicle cabin) of the seat. As a result, the second inflating portion can also serve as an inflating portion for protecting an occupant from a side collision (i.e., a side airbag or the like), for example.

In the vehicular occupant restraint system of the invention, the second inflating portion may also be provided in a side portion of a seat cushion.

Accordingly, the first inflating portion on the outside in the vehicle width direction is supported by the second inflating portion provided in the side portion of the seat cushion (a member in the vehicle cabin) of the seat. As a result, the second inflating portion can also serve as an inflating portion for protecting an occupant from a side collision (i.e., a side airbag or the like), for example.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicular occupant restraint system comprising:
a four-point seatbelt system having a pair of left and right webbings for restraining an occupant;
a pair of right and left first inflating portions which are respectively provided on the pair of right and left webbings at upper body restraining portions thereof for restraining an upper body of the occupant and which inflate by receiving a supply of gas from a gas supplying portion and deploy in front of the upper body of the occupant, so that the right first inflating portion and the left first inflating portion contact and push each other in a seat width direction; and
a pair of right and left second inflating portions which inflate by receiving a supply of gas from the gas supplying portion when the first inflating portions inflate, and deploy so the right second inflating portion contacts the right first inflating portion from outside in the seat width direction and the left second inflating portion contacts the left first inflating portion from outside in the seat width direction and thus support the pair of right and left first inflating portions from the outside in the seat width direction.

2. The vehicular occupant restraint system according to claim 1, wherein the second inflating portions are set to finish deploying before the first inflating portions finish deploying.

3. The vehicular occupant restraint system according to claim 1, wherein at least one of the second inflating portions is provided in a portion that constitutes a member provided in a vehicle cabin or an inside wall of the vehicle cabin.

4. The vehicular occupant restraint system according to claim 1, wherein at least one of the second inflating portions is provided in a side door and the other of the second inflating portions is provided in a center console.

5. The vehicular occupant restraint system according to claim 1, wherein at least one of the second inflating portions is provided in a side portion of a seatback.

6. The vehicular occupant restraint system according to claim 1, wherein at least one of the second inflating portions is provided in a side portion of a seat cushion.

7. The vehicular occupant restraint system according to claim 1, wherein the second inflating portions function to restrain a pelvic area of the occupant by inflating.

8. The vehicular occupant restraint system according to claim 7, wherein the second inflating portions are provided on the left and right webbings at waist restraining portions thereof that restrain the pelvic area of the occupant.

* * * * *